(12) United States Patent
Burk

(10) Patent No.: US 12,699,518 B2
(45) Date of Patent: Aug. 4, 2026

(54) PARTITIONING SYSTEM DATA FROM USER DATA IN MEMORY

(71) Applicant: Micron Technology, Inc., Boise, ID (US)

(72) Inventor: Michael Burk, Orangevale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/010,977

(22) Filed: Jan. 6, 2025

(65) Prior Publication Data

US 2025/0138734 A1     May 1, 2025

Related U.S. Application Data

(62) Division of application No. 17/894,343, filed on Aug. 24, 2022, now Pat. No. 12,189,967.

(51) Int. Cl.
G06F 3/06          (2006.01)

(52) U.S. Cl.
CPC .......... G06F 3/0623 (2013.01); G06F 3/0644 (2013.01); G06F 3/0679 (2013.01)

(58) Field of Classification Search
CPC .... G06F 3/0623; G06F 3/0644; G06F 3/0679; G06F 3/0622; G06F 12/0246; G06F 2212/7201; G06F 2212/7202
See application file for complete search history.

(56) References Cited

U.S. PATENT DOCUMENTS

| | | | |
|---|---|---|---|
| 8,180,995 B2 | 5/2012 | Asnaashari et al. | |
| 8,839,431 B2 | 9/2014 | Bennett | |
| 9,032,387 B1 | 5/2015 | Hill | |
| 10,241,696 B1 | 3/2019 | Kowalyshyn | |
| 11,301,346 B2 | 4/2022 | Marquart et al. | |
| 2002/0157010 A1 | 10/2002 | Dayan | |
| 2010/0011275 A1* | 1/2010 | Yang .................. | G11B 20/1803 |
| | | | 714/755 |
| 2010/0070688 A1* | 3/2010 | Lin ....................... | G11C 16/349 |
| | | | 711/E12.001 |
| 2012/0246394 A1* | 9/2012 | Ou ....................... | G06F 12/0246 |
| | | | 711/E12.008 |
| 2013/0074178 A1 | 3/2013 | Sobol | |
| 2014/0331119 A1 | 11/2014 | Dixon | |
| 2016/0269537 A1 | 9/2016 | Gandhi | |
| 2018/0046399 A1* | 2/2018 | Huang ................. | G06F 3/0637 |
| 2019/0004734 A1* | 1/2019 | Kirshenbaum ....... | G06F 3/0659 |

(Continued)

*Primary Examiner* — Khoa D Doan
(74) *Attorney, Agent, or Firm* — Brooks, Cameron & Huebsch, PLLC

(57)          ABSTRACT
The present disclosure includes apparatuses, methods, and systems for partitioning system data from user data in memory. In an example, a method can include receiving system data at a memory, assigning the system data a first address within a first range of memory addresses, storing the system data in a first portion of the memory operated with a first set of trim settings in response to the system data having the first address within the first range of memory addresses, receiving user data, assigning the user data a second address within a second range of memory addresses, and storing the user data in a second portion of the memory operated with a second set of trim settings in response to the user having the second address within the second range of addresses.

19 Claims, 4 Drawing Sheets

(56) References Cited

U.S. PATENT DOCUMENTS

| | | | |
|---|---|---|---|
| 2019/0272871 A1* | 9/2019 | Yang | G11C 16/3418 |
| 2020/0167078 A1* | 5/2020 | Ke | G06F 3/0619 |
| 2021/0157563 A1 | 5/2021 | Duval | |
| 2023/0168831 A1 | 6/2023 | Lee | |

* cited by examiner

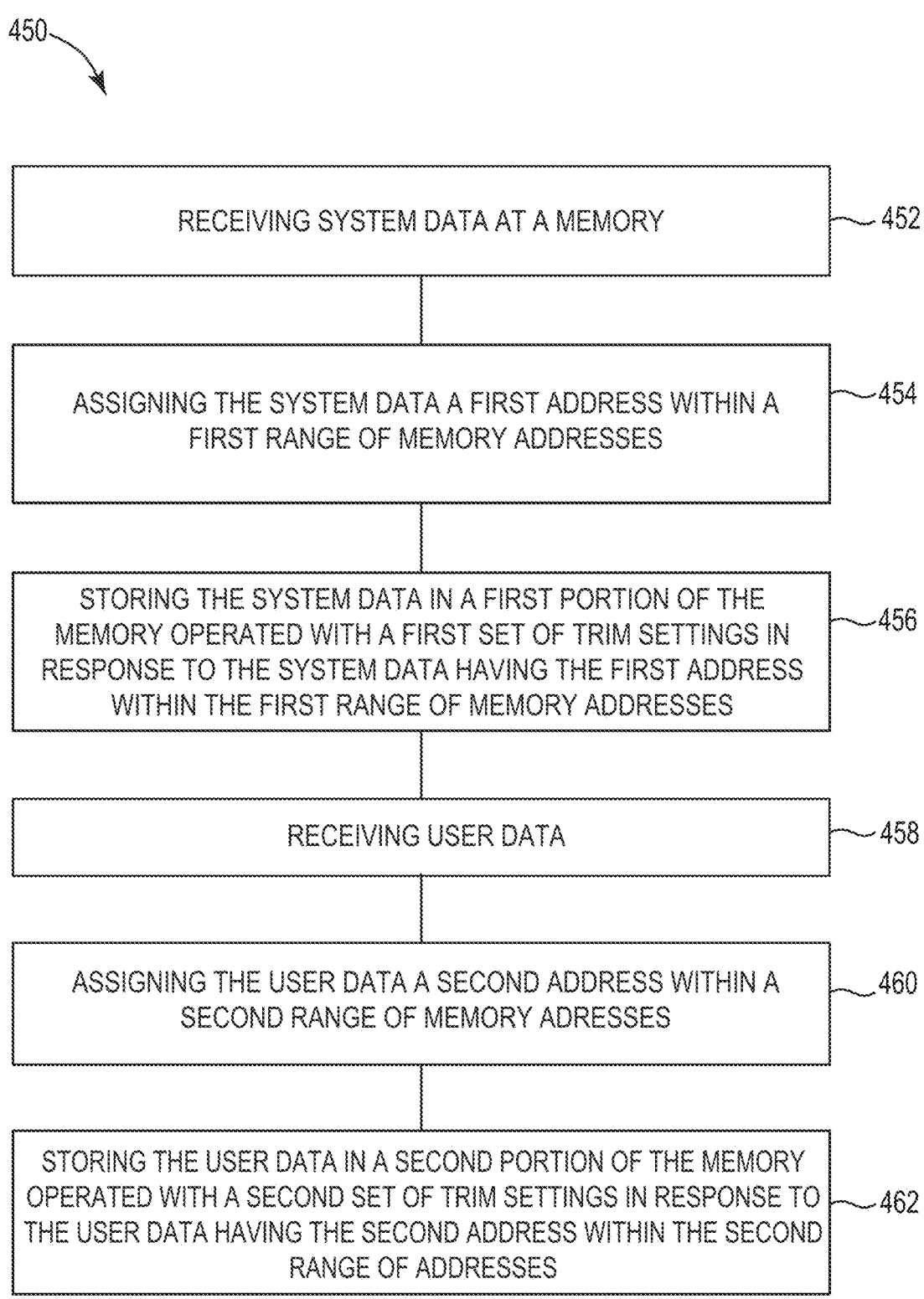

450

RECEIVING SYSTEM DATA AT A MEMORY ~452

ASSIGNING THE SYSTEM DATA A FIRST ADDRESS WITHIN A FIRST RANGE OF MEMORY ADDRESSES ~454

STORING THE SYSTEM DATA IN A FIRST PORTION OF THE MEMORY OPERATED WITH A FIRST SET OF TRIM SETTINGS IN RESPONSE TO THE SYSTEM DATA HAVING THE FIRST ADDRESS WITHIN THE FIRST RANGE OF MEMORY ADDRESSES ~456

RECEIVING USER DATA ~458

ASSIGNING THE USER DATA A SECOND ADDRESS WITHIN A SECOND RANGE OF MEMORY ADRESSES ~460

STORING THE USER DATA IN A SECOND PORTION OF THE MEMORY OPERATED WITH A SECOND SET OF TRIM SETTINGS IN RESPONSE TO THE USER DATA HAVING THE SECOND ADDRESS WITHIN THE SECOND RANGE OF ADDRESSES ~462

FIG. 4

PARTITIONING SYSTEM DATA FROM USER DATA IN MEMORY

PRIORITY INFORMATION

This application is a Divisional of U.S. application Ser. No. 17/894,343, filed on Aug. 24, 2022, the contents of which are incorporated herein by reference.

TECHNICAL FIELD

The present disclosure relates generally to apparatuses, methods, and systems for partitioning system data from user data in memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory.

A host can utilize memory devices to store data. A host can be a vehicle, for example. Vehicles are becoming more dependent upon memory devices to provide storage for components that were previously mechanical, independent, or non-existent. A vehicle can include a computing system, which can be a host for a memory device. The vehicle may be driver operated, driver-less (autonomous), and/or partially autonomous.

BRIEF DESCRIPTION OF THE DRAWINGS

FIG. 4 is a flow diagram of a method for partitioning system data from user data in memory in accordance with an embodiment of the present disclosure.

DETAILED DESCRIPTION

Figure 1:
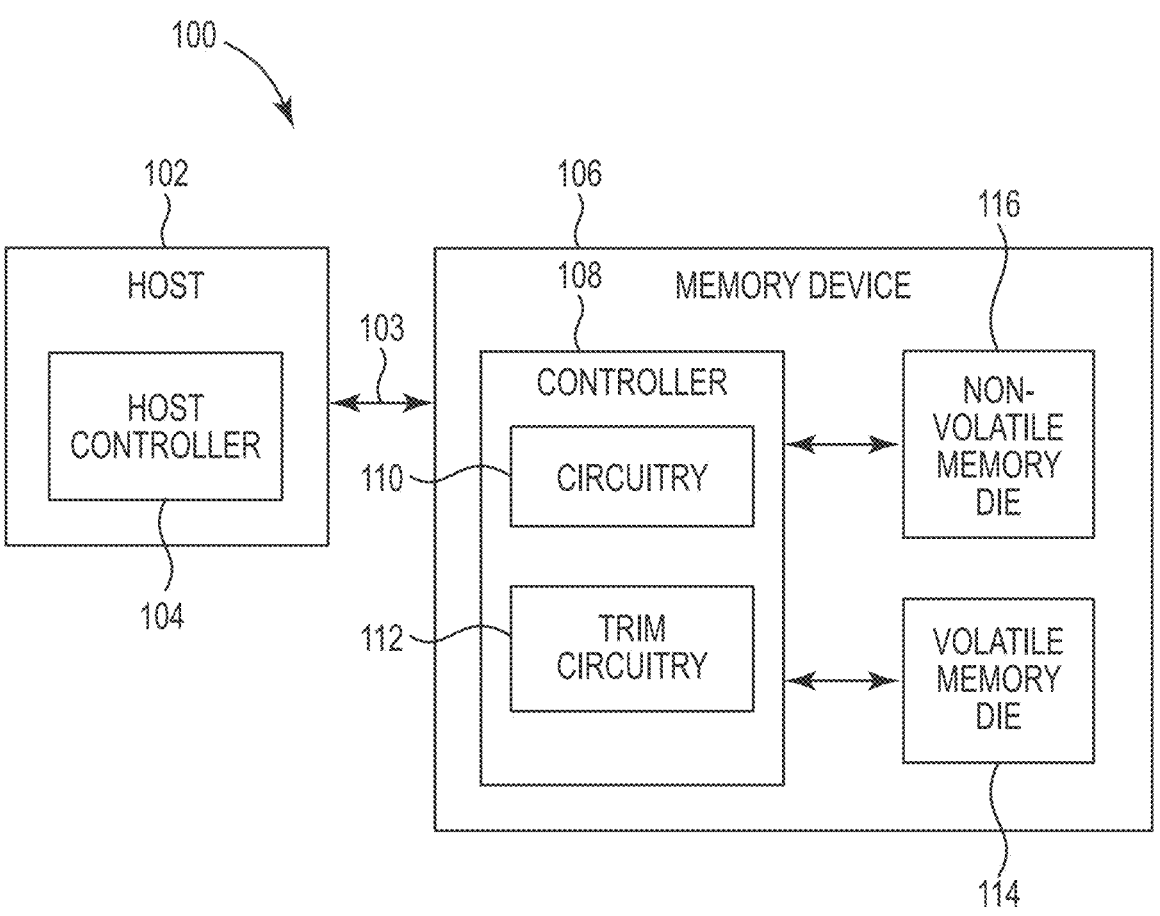
FIG. 1 is a block diagram of a computing system including a host and an apparatus in the form of a memory device in accordance with an embodiment of the present disclosure.

The present disclosure includes apparatuses, methods, and systems for partitioning system data from user data in memory. In an example, a method can include receiving system data at a memory, assigning the system data a first address within a first range of memory addresses, storing the system data in a first portion of the memory operated with a first set of trim settings in response to the system data having the first address within the first range of memory addresses, receiving user data, assigning the user data a second address within a second range of memory addresses, and storing the user data in a second portion of the memory operated with a second set of trim settings in response to the user having the second address within the second range of addresses.

A memory of a vehicle can store system data and user data. However, user data including user applications, data uploads, and/or uncontrollable usage can cause unknown wear and endurance characteristics and/or inadvertently expose the memory to malware. Accordingly, user data, if left unchecked, could cause a catastrophic system crash, which could result in an inability to operate the vehicle or a vehicle accident, for example. To prevent catastrophic system crashes, system data can be stored on a different memory device than user data. However, two memory devices can take up already limited space in a vehicle, the excess weight of two memory devices can reduce the fuel or battery efficiency of the vehicle, and/or the two memory devices can increase the cost of the vehicle.

Aspects of the present disclosure address the above and other deficiencies by partitioning a single memory before a user operates the memory to store system data separate from user data by assigning memory addresses within different memory address ranges for system data and user data. In a number of embodiments, the portion of the memory where the system data is stored can have better endurance characteristics than the portion of the memory where the user data is stored to ensure the vehicle can operate even if the portion of the memory storing the user data is full or has been exposed to malware.

As used herein, "a", "an", or "a number of" can refer to one or more of something, and "a plurality of" can refer to two or more such things. For example, a number of portions of memory can refer to one or more portions, and a plurality of portions of memory can refer to two or more portions. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

FIG. 1 is a block diagram of a computing system 100 including a host 102 and an apparatus in the form of a memory device 106 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 100 can include a number of memory devices analogous to memory device 106.

The computing system 100 including host 102 and/or memory device 106 can be, or be part of, an Internet of Things (IoT) enabled device, a vehicle, an automation tool, an industrial protocol camera among other host systems, and can include a memory access device (e.g., a processor). One of ordinary skill in the art will appreciate that "a processor" can intend one or more processors, such as a parallel processing system, a number of coprocessors, etc.

In the embodiment illustrated in FIG. 1, memory device 106 can include a non-volatile memory die 116 and a volatile memory die 114. A first range of addresses and a second range of addresses can be stored in the non-volatile memory die 116 to prevent the first range of addresses and the second range of addresses from being deleted when the memory device 106 is powered down. For example, the computing system 100 can be a vehicle and the memory device 106 of the vehicle can be powered on in response to a proximity of a fob of the vehicle being detected and/or the vehicle being turned on. When the memory device 106 is powered on, the non-volatile memory die 116 retains the first range of addresses for system data and the second range of addresses are for user data. Accordingly, the vehicle can still operate even if the memory portion used for user data is full or has malware because the first range of addresses and the second range of addresses are fixed across power cycles of the memory device 106.

The memory device 106 can be any non-volatile memory device including, but not limited to, UFS, e.MMC, and/or SSD. The non-volatile memory die 116 can be a flash memory die such as a NAND flash die and the volatile memory die 114 can be a DRAM, for example. Embodiments are not limited to any particular quantity of non-volatile memory dies 116 or volatile memory dies 114 in the memory device 106. One of each is illustrated as an example.

A number of physical blocks of memory cells can be included in a plane of memory cells, and a number of planes of memory cells can be included on non-volatile memory die 116 and/or volatile memory die 114. The memory cells can be single level cells and/or multilevel cells such as, for instance, two level cells, triple level cells (TLCs) or quadruple level cells (QLCs). Each physical block can include a number of physical rows of memory cells coupled to access lines (e.g., word lines). The number of rows (e.g., word lines) in each physical block can be 32, but embodiments are not limited to a particular number of rows per physical block. Further, although not shown in FIG. 1, the memory cells can be coupled to columns of sense lines (e.g., data lines and/or digit lines).

As one of ordinary skill in the art will appreciate, each row can include a number of pages of memory cells (e.g., physical pages). A physical page refers to a unit of programming and/or sensing (e.g., a number of memory cells that are programmed and/or sensed together as a functional group). In a number of embodiments, each row can comprise one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd num-bered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

In some examples, a page of memory cells can comprise a number of physical sectors (e.g., subsets of memory cells). Each physical sector of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks, rows, sectors, and pages are possible. For example, rows of physical blocks can each store data corresponding to a single logical sector which can include, for example, more or less than 512 bytes of data.

As illustrated in FIG. 1, host 102 can be coupled to the memory device 106 via host interface 103. Host 102 and memory device 106 can communicate (e.g., send commands and/or data) on host interface 103. Host interface 103 can be in the form of a standardized physical interface. For example, when memory device 106 is used for information storage in computing system 100, host interface 103 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, host interface 103 can provide an interface for passing control, address, information (e.g., data), and other signals between memory device 106 and host 102 having compatible receptors for host interface 103.

Memory device 106 includes controller 108 to communicate with host 102, non-volatile memory die 116, and volatile memory die 114. For instance, controller 108 can send commands to perform operations on non-volatile memory die 116 and/or volatile memory die 114, including operations to sense (e.g., read), program (e.g., write), move, and/or erase data, among other operations.

Controller 108 can be included on the same physical device (e.g., the same die) as non-volatile memory die 116. Alternatively, controller 108 can be included on a separate physical device that is communicatively coupled to the physical device that includes non-volatile memory die 116. In an embodiment, components of controller 108 can be spread across multiple physical devices (e.g., some components on the same die as the memory, and some components on a different die, module, or board) as a distributed controller.

The host 102 can include a host controller 104 to communicate with memory device 106. The host controller 104 can be coupled to and/or send commands to memory device 106 and/or controller 108 via host interface 103. The host controller 104 can communicate with memory device 106 and/or the controller 108 on the memory device 106 to read, write, and/or erase data, among other operations. For example, the host 102 can transmit a write command to the memory device 106 to store data in the memory device 106 via the host interface 103.

Controller 108 on memory device 106 and/or host controller 104 on host 102 can include control circuitry and/or logic (e.g., hardware and firmware). In a number of embodiments, controller 108 on memory device 106 and/or host controller 104 on host 102 can be an application specific integrated circuit (ASIC) coupled to a printed circuit board including a physical interface. Also, memory device 106 and/or host 102 can include a buffer of volatile and/or non-volatile memory and one or more registers.

As shown in FIG. 1, memory device 106 can include circuitry 110 and trim circuitry 112. In the embodiment illustrated in FIG. 1, circuitry 110 and trim circuitry 112 are included in controller 108. However, embodiments of the present disclosure are not so limited. For instance, in some examples, circuitry 110 and/or trim circuitry 112 may be included in non-volatile memory die 116 (e.g., instead of in controller 108). Circuitry 110 and/or trim circuitry 112 can comprise, for instance, hardware, firmware, and/or software for performing operations described herein. For example, the circuitry 110 can be configured to store data in a first portion of a memory volume provided by the non-volatile memory die 116 in response to identifying the data as black box or telemetry data. The circuitry 110 can further be configured to store other data in the second portion of the memory volume in response to identifying the other data as infotainment data. The first portion of the memory can be a first partition. The second portion of the memory can be a second partition.

The trim circuitry 112 can comprise an ASIC configured to perform the examples described herein. The trim circuitry 112 can be configured to cause different memory cells of the non-volatile memory die 116 to be operated with different trims. For example, memory cells corresponding to a first portion (e.g., first portion 244 in FIG. 2) can be operated with a first trim tailored to memory cell endurance and memory cells corresponding to a second portion (e.g., second portion 246 in FIG. 2) can be operated with a second trim tailored to data retention. Trims are sets of operating parameters, such as voltages, which can be used to operate memory cells. The trim circuitry 112 can issue or cause to be issued a set trim command, which causes the non-volatile memory die 116 (or portions thereof) to use a particular set of operating parameters to operate the memory cells of the non-volatile memory die 116. Trims can include operating parameters associated with various operations such as program (write), program verify, erase, erase verify, and sense (read), among other operations associated with an array of memory cells. Examples of trims include programming voltages, programming frequency, and programming time length.

Trims can be used to achieve or adjust desired threshold voltage (Vt) distributions and/or the voltage spread between different Vt distributions for different data states for memory cells of the non-volatile memory die 116. Trims can be used to cause the non-volatile memory die 116 to be operated with different program times. Different trims can be used for different operations such as programming, reading, and erasing, to achieve different performance targets such as programming speed, reading speed, data retention over time (how long a memory cell reliably stores the data programmed thereto), and memory cell endurance (how reliably a memory cell operates after various quantities of program/ erase cycles). The effects of different trims on different performance targets can be known based on testing, historical observation, theoretical modeling, active monitoring of the operation of a memory device, and other methods. For example, a faster programming time can provide better programming speed, but can yield relatively poor data retention over time. A slower programming time can provide slower programming speed but can yield better data retention over time. A faster programming time can also provide for the ability to use a smaller or fewer hold-up capacitors to program data.

Examples of trims include a program start voltage, a program step voltage, a program inhibit start voltage, and an erase verify voltage. The program start voltage is the magnitude of an initial programming voltage pulse of a series of voltage pulses applied to a selected word line during a programming operation performed on memory cells in a selected block. The program step voltage is the voltage step size between programming voltage pulses. The program inhibit start voltage is a voltage used to inhibit further programming of memory cells once the Vt level associated with a desired data state has been reached. The erase verify voltage is the voltage used to check whether memory cells in the selected block have a Vt level indicative of the erase state.

Other examples of trims include read reference voltages and/or program verify voltages. Program verify voltages represent target voltage levels to which memory cells are to be programmed in order to represent a particular data state. Read reference voltages are voltage levels that can be located between program Vt distributions and used to determine a particular data state of a data cell during a data read operation.

Figure 2:
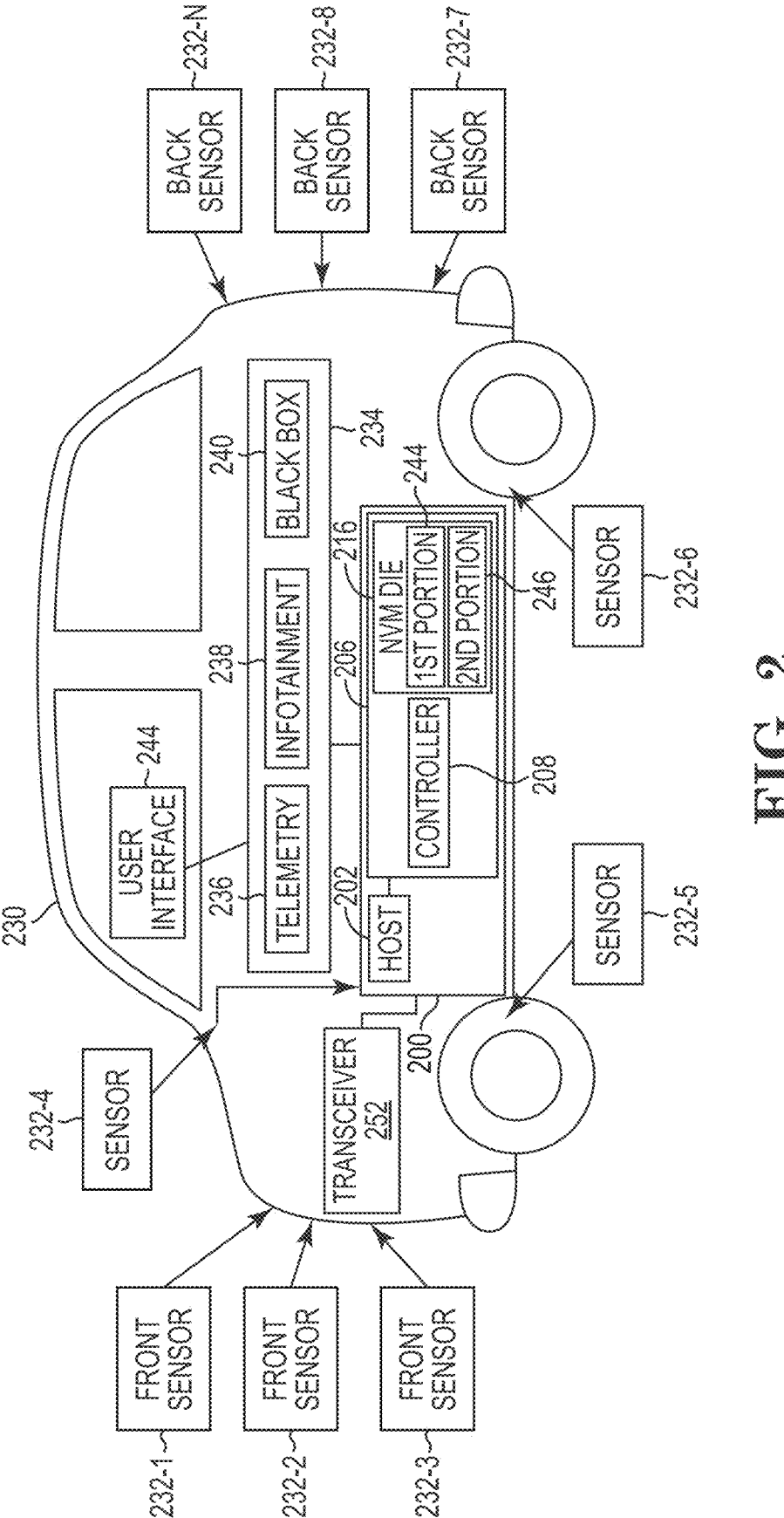
FIG. 2 illustrates an example of a system including a computing system in a vehicle in accordance with some embodiments of the present disclosure.

FIG. 2 illustrates an example of a system including a computing system 200 in a vehicle 230 in accordance with some embodiments of the present disclosure. The computing system 200 can include a memory device 206, which is illustrated as including a controller 208 and a non-volatile memory die 216 for simplicity. The memory device 206 is coupled to a host 202.

The computing system 200, and thus the host 202, can be coupled to a number of sensors 232 either directly, as illustrated for the sensor 232-4 or via a transceiver 252 as illustrated for the sensors 232-1, 232-2, 232-3, 232-5, 232-6, 232-7, 232-8, . . . , 232-N. The transceiver 252 is able to receive data from the sensors 232 wirelessly, such as by radio frequency communication. In at least one embodiment, each of the sensors 232 can communicate with the computing system 200 wirelessly via the transceiver 252. In at least one embodiment, each of the sensors 232 is connected directly to the computing system 200 (e.g., via wires or optical cables).

The vehicle 230 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 232 are illustrated in FIG. 2 as including example attributes. For example, sensors 232-1, 232-2, and 232-3 are cameras collecting data from the front of the vehicle 230. Sensors 232-4, 232-5, and 232-6 are microphone sensors collecting data from the from the front, middle, and back of the vehicle 230. The sensors 232-7, 232-8, and 232-N are cameras collecting data from the back of the vehicle 230. As another example, the sensors 232-5, 232-6 are tire pressure sensors. As another example, the sensor 232-4 is a navigation sensor, such as a global positioning system (GPS) receiver. As another example, the sensor 232-6 is a speedometer. As another example, the sensor 232-4 represents a number of engine sensors such as a temperature sensor, a pressure sensor, a voltmeter, an ammeter, a tachometer, a fuel gauge, etc. As another example, the sensor 232-4 represents a camera. Video data can be received from any of the sensors 232 associated with the vehicle 230 comprising cameras. In at least one embodiment, the video data can be compressed by the host 202 before providing the video data to the memory device 206.

The host 202 can execute instructions to provide an overall control system and/or operating system for the vehicle 230. When a user wants to use the vehicle 230, the user does not want to worry about the vehicle not starting or the vehicle not operating properly. Therefore, before a user may use the vehicle 230, a memory volume provided by the memory die 216 is partitioned to store system data separately from user data by assigning memory addresses within different memory address ranges to respective partitions dedicated for system data and user data. In a number of embodiments, the first portion 244 of the memory where the system data is stored can have better endurance characteristics than the second portion 246 of the memory die where the user data is stored to ensure the vehicle 230 can operate even if the second portion 246 of the memory storing the user data is full or has been exposed to malware. In some examples, a user is unable to modify or delete system data stored in the first portion 244 of the memory and able to modify or delete user data stored in the second portion 246 of the memory.

The host 202 can be a controller designed to assist in automation endeavors of the vehicle 230. For example, the host 202 can be ADAS controllers. An ADAS can monitor data to prevent accidents and provide warning of potentially unsafe situations. For example, the ADAS can monitor sensors in the vehicle 230 and take control of vehicle 230 operations to avoid accident or injury (e.g., to avoid accidents in the case of an incapacitated user of a vehicle). The host 202 may need to act and make decisions quickly to avoid accidents. The memory device 206 can store reference data such that data from the sensors 232 can be compared to the reference data by the host 202 in order to make quick decisions.

The host 202 can write data received from one or more sensors 232 and store the data (e.g., in association with a black box application 240 for the vehicle 230). The black box application 240 may also be referred to as an accident data recorder. With the advent of autonomous vehicles, some autonomous driving requires real time buffering of telemetric data such as video cameras, RADAR, LIDAR, ultrasonic, and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 202 can execute instructions to provide a set of applications 234 for the vehicle 230 including telemetry 236, infotainment 238, and a black box 240. The telemetry application 236 can provide information displayable on a user interface 244 such as may be associated with the instrumentation and/or dashboard of a vehicle 230. An example of such telemetric information is the speed at which the vehicle 230 is traveling (e.g., based at least in part on data from a sensor 232).

The infotainment application 238 can include information and/or entertainment for a user of the vehicle 230 displayable or interfaced via the user interface 244. Examples of such information and/or entertainment include music, movies, GPS information such as a moving map, etc. The memory device 206 can provide storage for any of the set of applications 234. In a number of embodiments, infotainment data used for the infotainment application 238 can be stored in the second portion 246 of the memory and black box data used for the black box 240, telemetry data used for telemetry 236, and/or operating system (OS) data used for running an OS can be stored in the first portion 244 of the memory.

Figure 3:
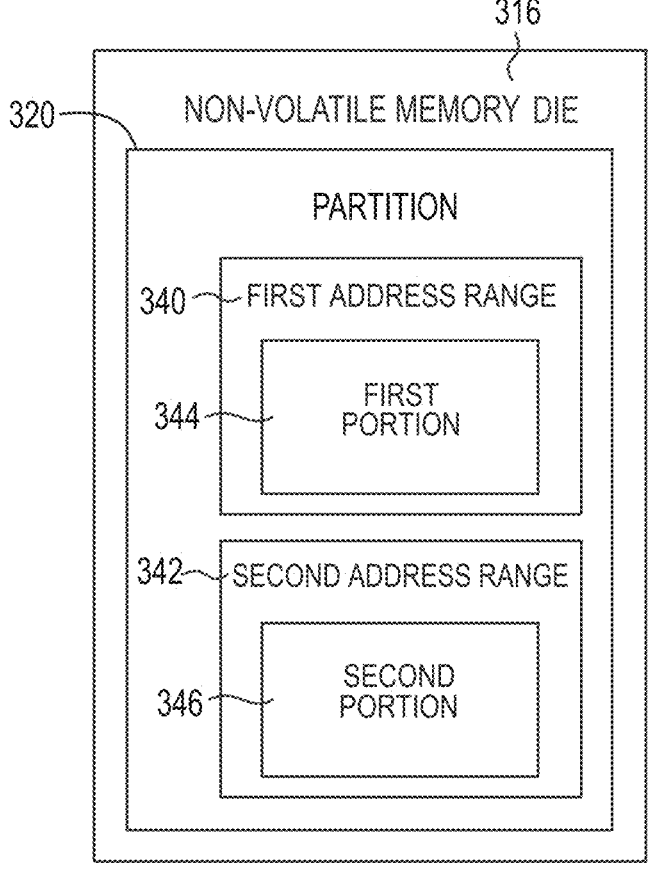
FIG. 3 is a block diagram of a non-volatile memory die including a partition in accordance with an embodiment of the present disclosure.

FIG. 3 is a block diagram of a non-volatile memory die 316 including a partition 320 in accordance with an embodiment of the present disclosure. As described herein, the formatted non-volatile memory die 316 can provide a storage volume. One or more embodiments of the present disclosure can be used with file systems such as file allocation table (FAT), New Technology File System (NTFS), Unix File System (UFS), Universal Disk Format (UDF), etc. to create the partition 320 corresponding to a first portion 344 of the memory and a second portion 346 of the memory. In some examples, the non-volatile memory die 316 can include a first address range 340 for storing system data in the first portion 344 of the memory and a second address range 342 for storing user data in the second portion 346 of the 1*e* memory.

The system data can include data that relates to the operation of the non-volatile memory die 316, a memory device (e.g., memory device 206 in FIG. 2), a computing system (e.g., computing system 200 in FIG. 2), and/or a vehicle (e.g., vehicle 230 in FIG. 2). For example, the system data can be a software update, an over the air update, executable instructions to modify an operating system (OS), black box data, and/or telemetry data. The system data can be assigned an address within the first address range 340 and can be stored in the first portion 344 of the memory in response to the system data having an address within the first address range 340.

The user data can include data that relates to infotainment, user commands and/or application downloads, for example. The user data can be assigned an address within the second address range 342 and can be stored in the second portion 346 of the memory in response to the user data having an address within the second address range 342.

In a number of embodiments, data can be identified as system data or user data based on metadata. Metadata can include a sender address and/or physical parameters, such as memory size, among other parameters. In some examples, the size of the data packet can be used to identify whether the data is system data or user data. A large data packet can be indicative of a software update while a smaller data packet can be indicative of a music file, for example.

FIG. 4 is a flow diagram of a method 450 for partitioning system data from user data in memory in accordance with an embodiment of the present disclosure. At block 452, the method 450 can include receiving system data at a memory. The system data can include black box data, telemetry data, an over the air update, a modification to the OS, executable instructions to modify the OS, and/or a software update, for example.

At block 454, the method 450 can include assigning the system data a first address within a first range of memory addresses. The system data can be assigned to the first address within the first range of memory addresses in response to the system data including the black box data, the telemetry data, the over the air update, the modification to the OS, executable instructions to modify the OS, and/or the software update.

At block 456, the method 450 can include storing the system data in a first portion of the memory operated with a first set of trim settings in response to the system data having the first address within the first range of memory addresses. Accordingly, the system data can be stored in the first portion of the memory in response to the system data comprising the black box data, the telemetry data, the over the air update, the modification to the OS, executable instructions to modify the OS, and/or the software update. In some examples, the over the air update, the modification to the OS, executable instructions to modify the OS, and/or the software update can be executed in response to storing the system data in the first portion of the memory.

In a number of embodiments, the system data can be stored in the first portion of the memory in response to the system data being sent from a known device. A known device can be identified by its address. For example, the system data along with a sender address can be received. The sender address can be compared to a list of known addresses and the system data can be stored in the first portion of the memory in response to the sender address matching an address on the list of known addresses. Known addresses can include addresses of the vehicle manufacturer, memory device manufacturer, and/or vehicle dealer, for example.

At block 458, the method 450 can include receiving user data. The user data can comprise an application and/or infotainment data, for example. The user data can be downloaded in response to receiving a user command. As such, data can be identified as user data in response to the data being received because of a user command.

In a number of embodiments, the method 450 can include determining whether there is a risk that the user data comprises malware. In some examples, a risk that the user data comprises malware can be determined in response to the user data being downloaded by a user and/or received from an unknown sender.

At block 460, the method 450 can include assigning the user data a second address within a second range of memory addresses. The user data can be addressed to the second portion of the memory in response to receiving the user command and/or in response to determining there is a risk that the user data comprises malware.

At block 462, the method 450 can include storing the user data in a second portion of the memory operated with a second set of trim settings in response to the user data having the second address within the second range of addresses. The user data can be stored in the second portion of the memory in response to the user data comprising an application and/or infotainment data, for example.

In a number of embodiments, the user data can be stored in the second portion of the memory in response to the user data being sent from an unknown device. An unknown device can be identified by its address. For example, the user data along with a sender address can be received. The sender address can be compared to a list of known addresses and the user data can be stored in the second portion of the memory in response to the sender address failing to match an address on the list of known addresses. Method 450 can further include identifying data as the system data or the user data based on a sender address included with the data.

Method 450 can further include partitioning the first portion of the memory from the second portion of the memory prior to a user operating the memory. In some examples, the method 450 can further include pre-defining access rights for the first portion of the memory and the second portion of the memory when partitioning the memory. The access rights can prevent a user from modifying and/or deleting system data in the first portion of the memory and allow the user to modify and/or delete user data in the second portion of the memory.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

receiving system data at a memory;

assigning the system data a first address within a first range of memory addresses;

storing the system data in a first portion of the memory operated with a first set of trim settings in response to the system data having the first address within the first range of memory addresses;

receiving user data;

assigning the user data a second address within a second range of memory addresses; and storing the user data in a second portion of the memory operated with a second set of trim settings in response to the user data having the second address within the second range of memory addresses, wherein the first set of trim settings or the second set of trim settings comprise at least one of: a programming frequency or a programming time length.

2. The method of claim 1, wherein the method includes identifying data as the system data or the user data based on a sender address included with the data.

3. The method of claim 1, wherein the method includes pre-defining access rights for the first portion of the memory and the second portion of the memory when partitioning the memory.

4. The method of claim 1, wherein the method includes partitioning the first portion of the memory from the second portion of the memory prior to a user operating the memory.

5. The method of claim 1, wherein the first range of memory addresses and the second range of memory addresses are fixed across power cycles of the memory.

6. An apparatus, comprising:

memory; and trim circuitry configured to:

receive system data at the memory;

assign the system data a first address within a first range of memory addresses in response to receiving the system data;

store the system data in a first portion of the memory operated with a first set of trim settings in response to the system data having the first address within the first range of memory addresses;

receive user data;

assign the user data a second address within a second range of memory addresses in response to receiving the user data; and store the user data in a second portion of the memory operated with a second set of trim settings in response to the user data having the second address within the second range of memory addresses, wherein the first set of trim settings or the second set of trim settings comprise at least one of: a programming frequency or a programming time length.

7. The apparatus of claim 6, wherein the trim circuitry is included in a controller.

8. The apparatus of claim 6, wherein the trim circuitry is included in a non-volatile memory die.

9. The apparatus of claim 6, wherein the trim circuitry comprises an application specific integrated circuit (ASIC).

10. The apparatus of claim 6, wherein the first portion of the memory operated with the first set of trim settings is tailored to memory cell endurance.

11. The apparatus of claim 6, wherein the second portion of the memory operated with the second set of trim settings is tailored to data retention.

12. The apparatus of claim 6, wherein the first set of trim settings or the second set of trim settings are used to adjust a desired threshold voltage distribution.

13. The apparatus of claim 6, wherein the trim circuitry is configured to issue a set trim command.

14. The apparatus of claim 13, wherein the first portion of the memory is operated with the first set of trim settings in response to the set trim command.

15. The apparatus of claim 13, wherein the second portion of the memory is operated with the second set of trim settings in response to the set trim command.

16. A system, comprising:

a host; and a memory device coupled to the host, wherein the memory device comprises:

a memory; and a controller coupled to the memory, the controller including circuitry configured to:

receive system data at the memory from the host;

assign the system data a first address within a first range of memory addresses;

store the system data in a first portion of the memory operated with a first set of trim settings in response to the system data having the first address within the first range of memory addresses;

receive user data at the memory from the host;

assign the user data a second address within a second range of memory addresses; and store the user data in a second portion of the memory operated with a second set of trim settings in response to the user data having the second address within the second range of memory addresses, wherein the first set of trim settings or the second set of trim settings comprise at least one of: a programming frequency or a programming time length.

17. The system of claim 16, wherein the first set of trim settings and the second set of trim settings include operating parameters.

18. The system of claim 17, wherein the operating parameters are associated with operations including at least one of: program, program verify, erase, erase verify, or sense.

19. The system of claim 16, wherein the controller is configured to identify data as the system data or the user data based on metadata.

\* \* \* \* \*